July 1, 1941.  R. G. BOWER  2,247,938
CALCULATING MACHINE
Filed July 19, 1935    9 Sheets-Sheet 2

INVENTOR
Raymond G. Bower
BY
Davis, Macauley, May, Lindsey & Smith
ATTORNEYS

July 1, 1941.  R. G. BOWER  2,247,938
CALCULATING MACHINE
Filed July 19, 1935  9 Sheets-Sheet 3

INVENTOR
Raymond G. Bower
BY
Davis, Macauley, May, Lindsey & Smith
ATTORNEYS

July 1, 1941.  R. G. BOWER  2,247,938
CALCULATING MACHINE
Filed July 19, 1935    9 Sheets-Sheet 4

INVENTOR
Raymond G. Bower
BY
Davis, Macauley, May, Lindsey & Smith
ATTORNEYS

July 1, 1941.     R. G. BOWER     2,247,938
CALCULATING MACHINE
Filed July 19, 1935     9 Sheets-Sheet 5
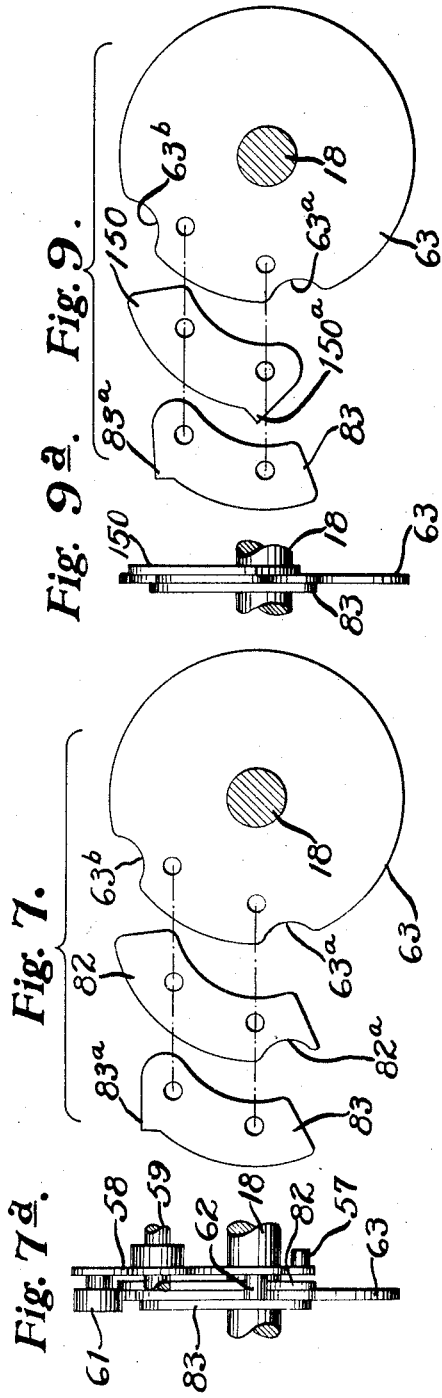
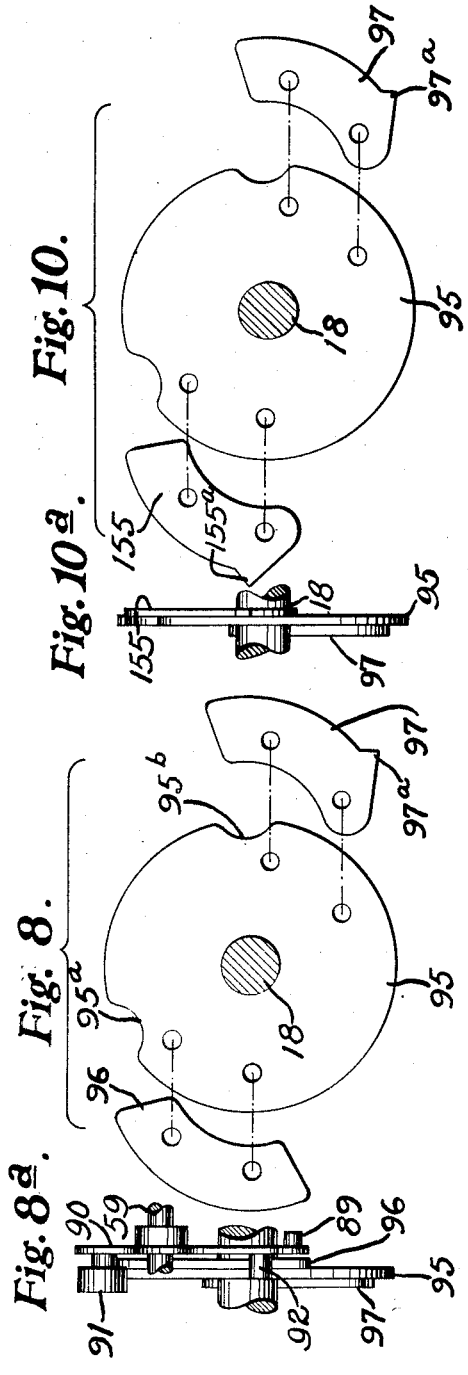
INVENTOR
Raymond G. Bower
BY
ATTORNEYS

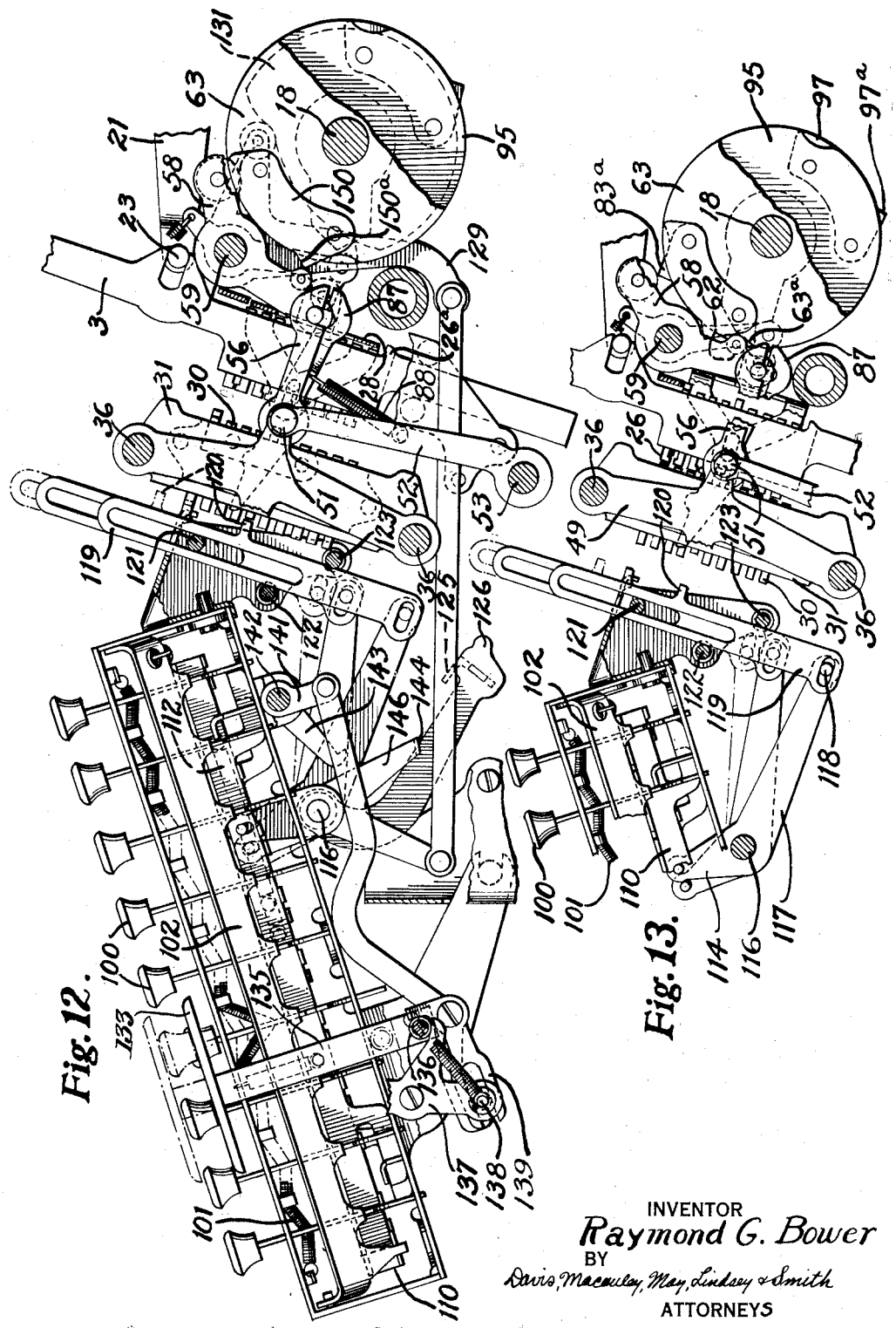

July 1, 1941.   R. G. BOWER   2,247,938
CALCULATING MACHINE
Filed July 19, 1935   9 Sheets-Sheet 8

INVENTOR
Raymond G. Bower
BY
Davis, Macauley, May, Lindsey & Smith
ATTORNEYS

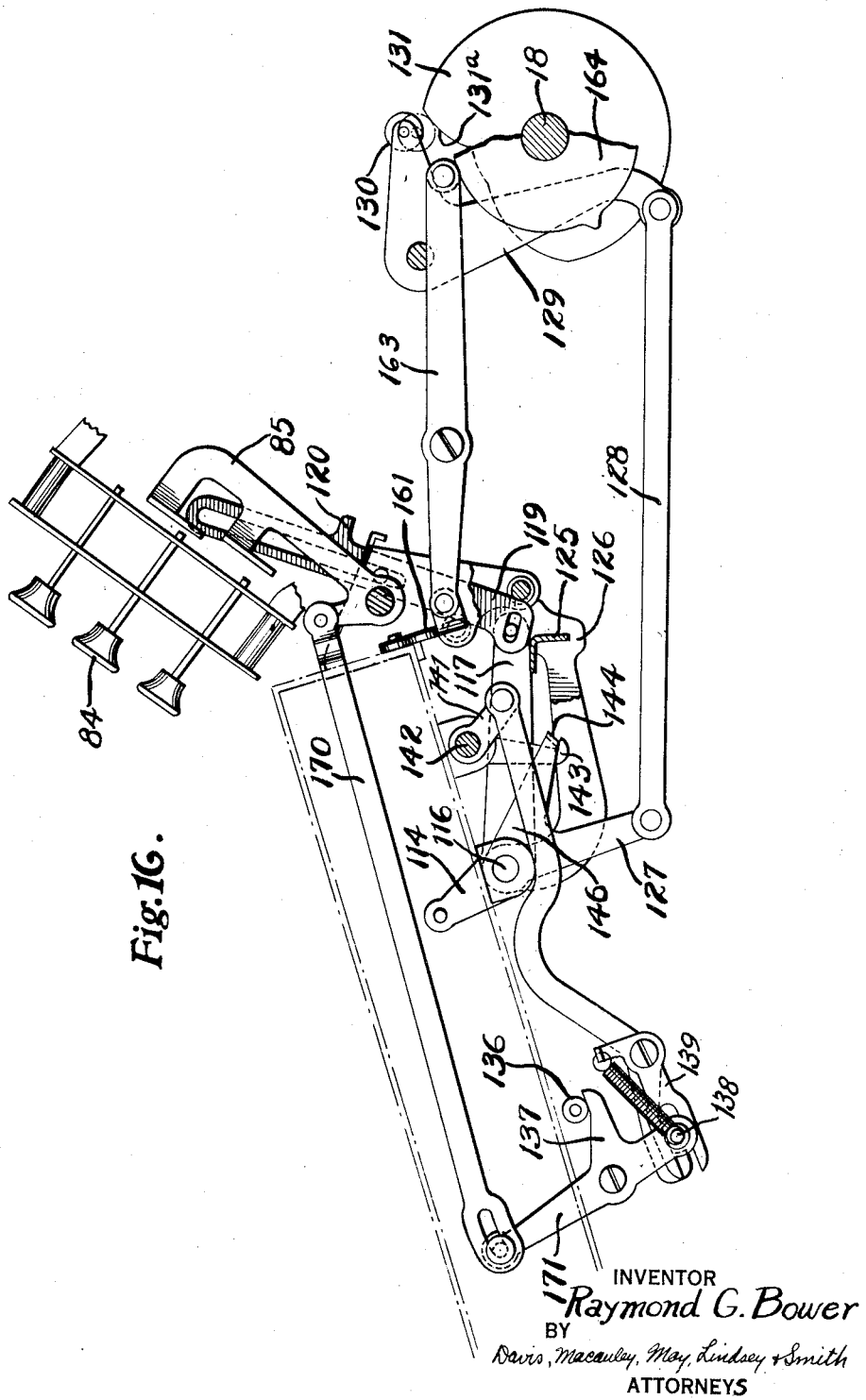

Patented July 1, 1941

2,247,938

UNITED STATES PATENT OFFICE 2,247,938

CALCULATING MACHINE

Raymond G. Bower, Bloomfield Hills, Mich., assignor to Burroughs Adding Machine Company, Detroit, Mich., a corporation of Michigan Application July 19, 1935, Serial No. 32,227

6 Claims. (Cl. 235—60)

This invention relates to a calculating machine, and it is directed to a novel construction that is particularly adapted to enable a machine of the "10-key" type to be converted into a machine of the "full-keyboard," or "81-key" type, and vice versa.

Having reference to the type of keyboard used there are, at present, two kinds of machines on the market, namely, the full-keyboard and the "10-key" types. The full-keyboard machine has a plurality of banks of amount keys with nine keys in each bank corresponding to the digits 1 to 9, inclusive. There are generally nine banks of these keys making a total of eighty-one keys, which accounts for the use of the term "81-key" keyboard often used to designate a full-keyboard machine. Where such term is used, it is understood that it does not necessarily mean a machine having eighty-one keys, but a machine of the type that employs a plurality of banks of keys, each bank containing nine keys and usually having nine banks or eighty-one keys, in all.

The "10-key" machine usually has nine amount keys corresponding to the digits 1 to 9, inclusive, and a "0" key, making a total of ten amount keys for entering items on the machine. Because of special keys sometimes used a machine of the latter type might not have exactly ten keys, but this type of machine will be referred to herein by the term generally employed to describe it, namely, "10-key" machine.

Certain advantages are claimed for each of these types of machines, but it is not possible for a customer to have both types without buying two complete machines, because the two types are built quite differently and are distinctly different machines. For the same reason it is necessary for the manufacturer to make and the dealer to maintain a stock of complete machines of both types if they are to satisfy all users.

It is an object of this invention to provide an improved calculating machine.

It is also an object of this invention to provide a construction that will enable an "81-key" or full keyboard machine to be readily converted into a "10-key" type and vice versa.

It is a further object of this invention to provide an early key release at the early portion of the cycle of a machine operation to permit resetting of the keys for a second entry before the close of the cycle of operation on the previous entry.

Other objects and their consequent advantages will be apparent from the following description taken in connection with the drawings in which, Figure 1 is a right side elevation of a calculating machine with the right side frame removed and showing the general construction with a "10-key" keyboard installed and with all parts in normal position;

Fig. 1ª is a plan of the "10-key" keyboard showing the key arrangement;

Figures 4, 5:
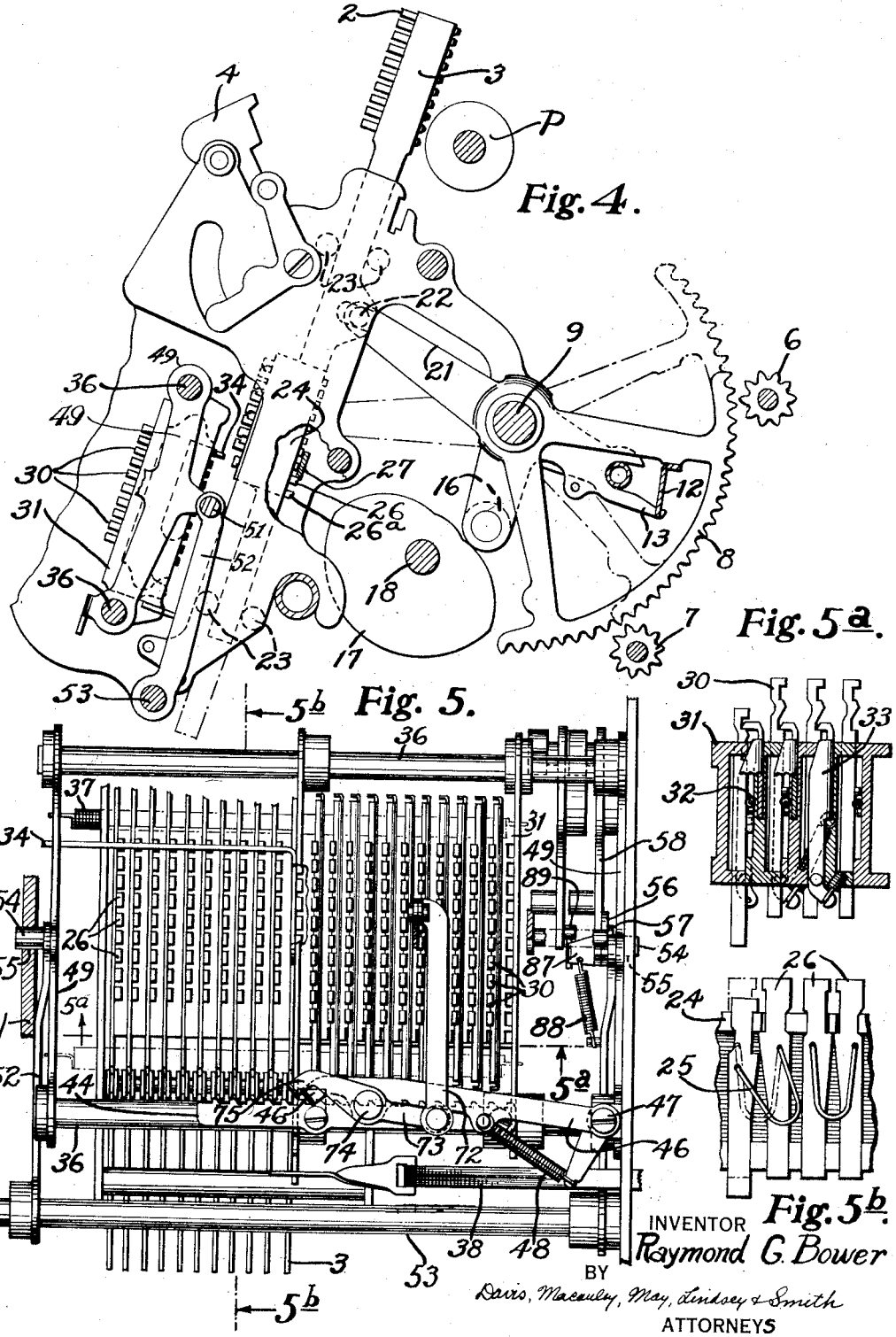
Fig. 4 is a partial side elevation similar to Fig. 2 illustrating the machine further advanced in operation with the type bars indexed and before printing.
Fig. 5 is a section on line 5—5 of Fig. 1 illustrating the pin carriage in plan section.
Figure 6:
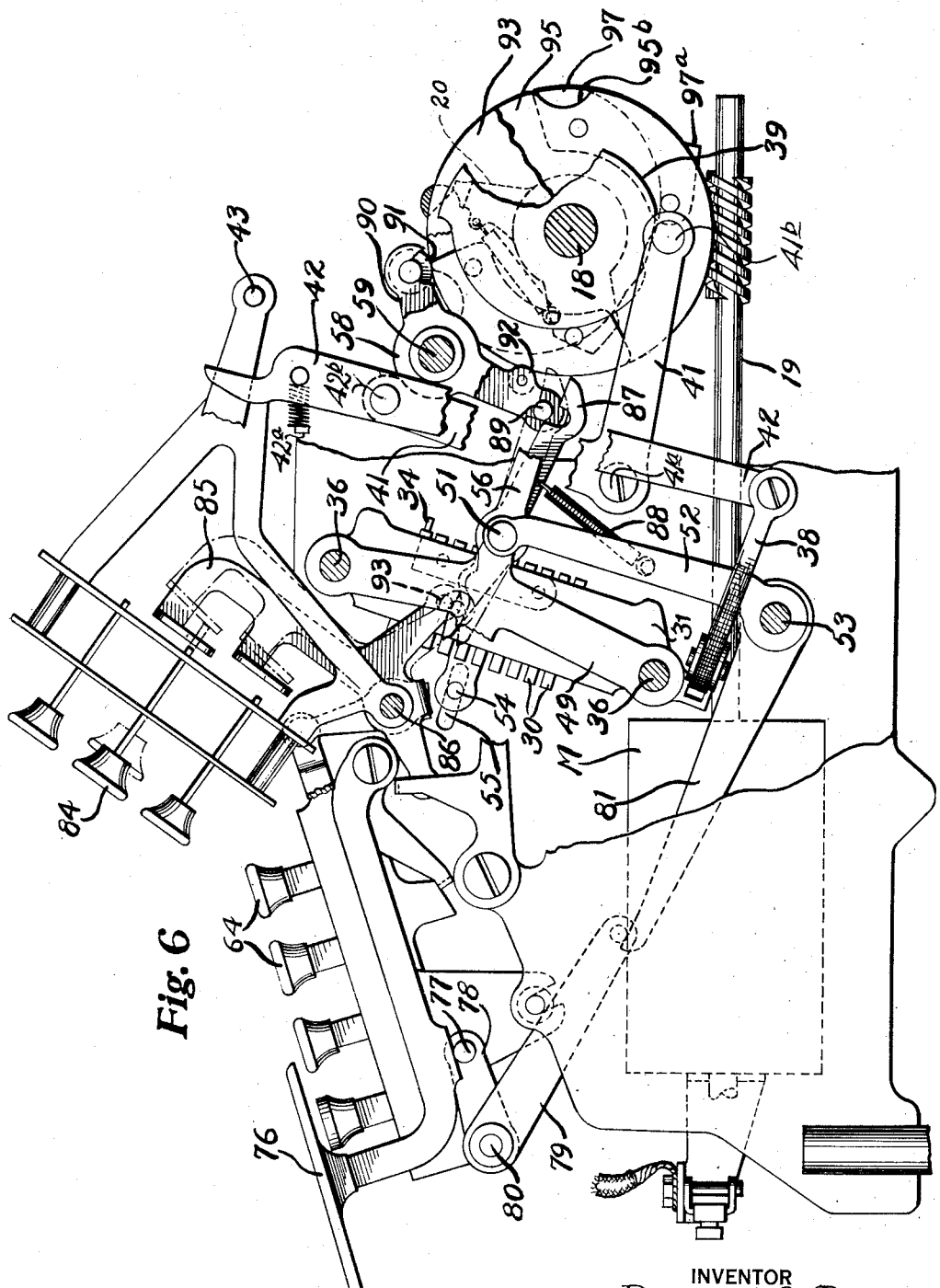

Fig. 5ª is a front sectional detail of a portion of the pin carriage taken on line 5ª of Fig. 5 illustrating the "flexible" pin arrangement;

Fig. 5ᵇ is a side sectional detail of a portion of the stop magazine taken on line 5ᵇ of Fig. 5;

Fig. 6 is a partial right side elevation illustrating more particularly the total-taking controls, the latter being in normal position;

Figs. 7, 8, 9 and 10 are diagrammatical views illustrating the several cams and cam plate attachments therefore in separated condition for operating the machine and used in converting from a "10-key" to a full-keyboard machine;

Figs. 7ª, 8ª, 9ª and 10ª are end elevations of the cams and cam plates in assembled positions.

Figure 1:
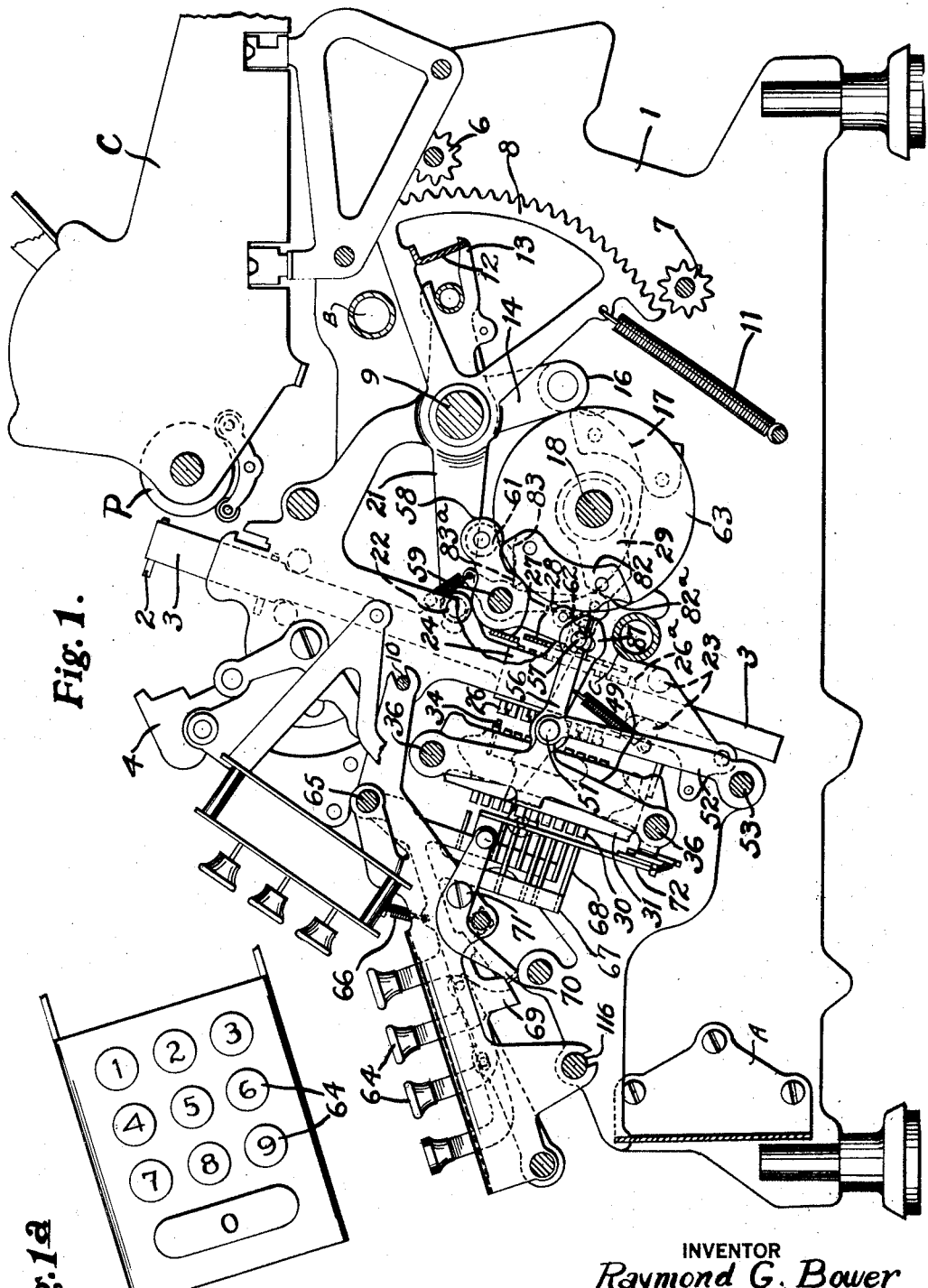
Figure 11:
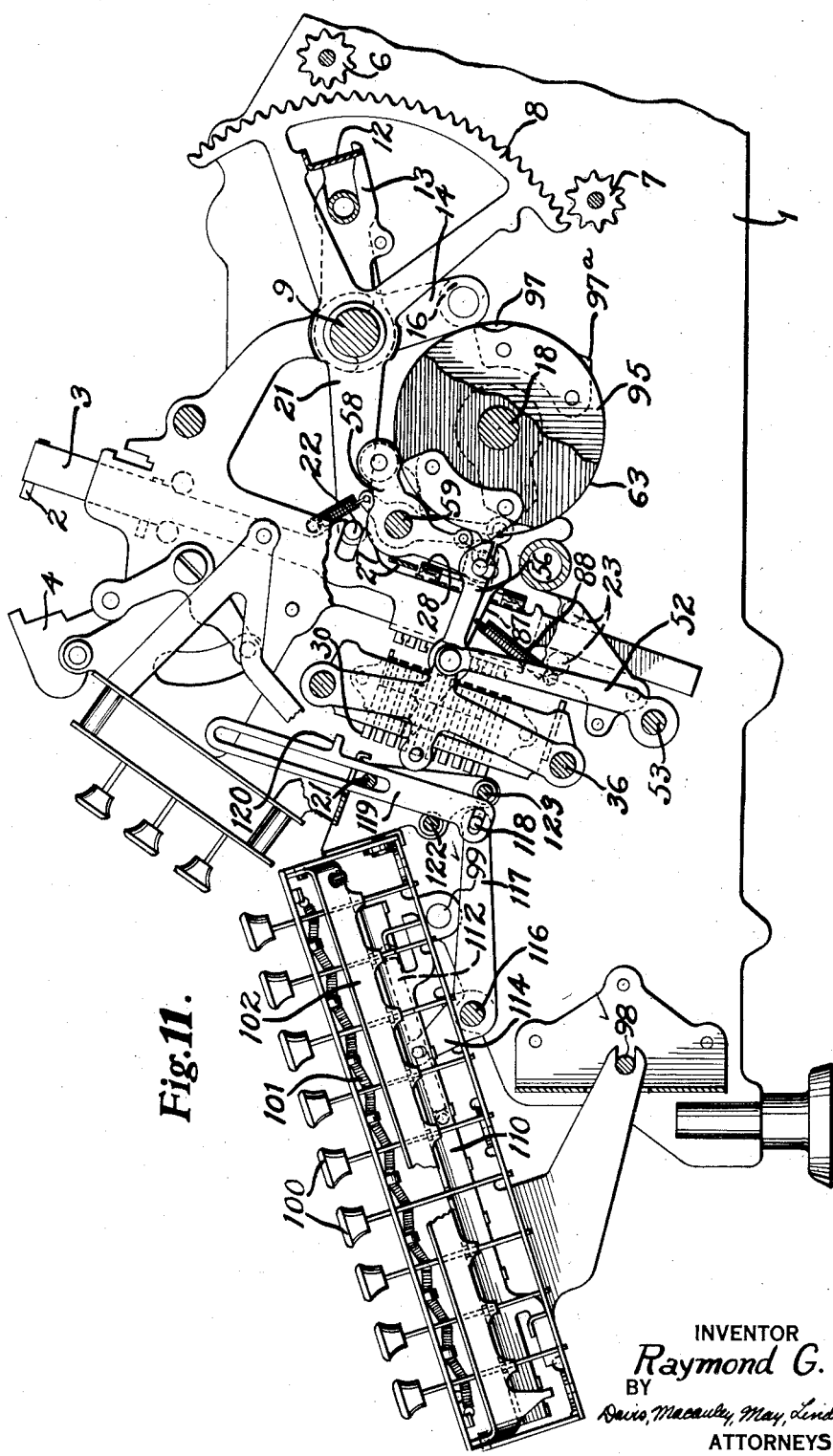
Figure 14:
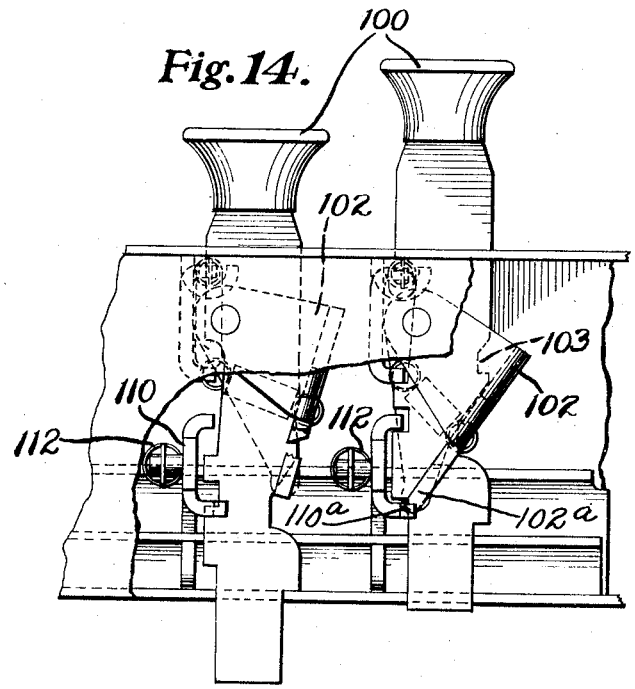
Figure 15:
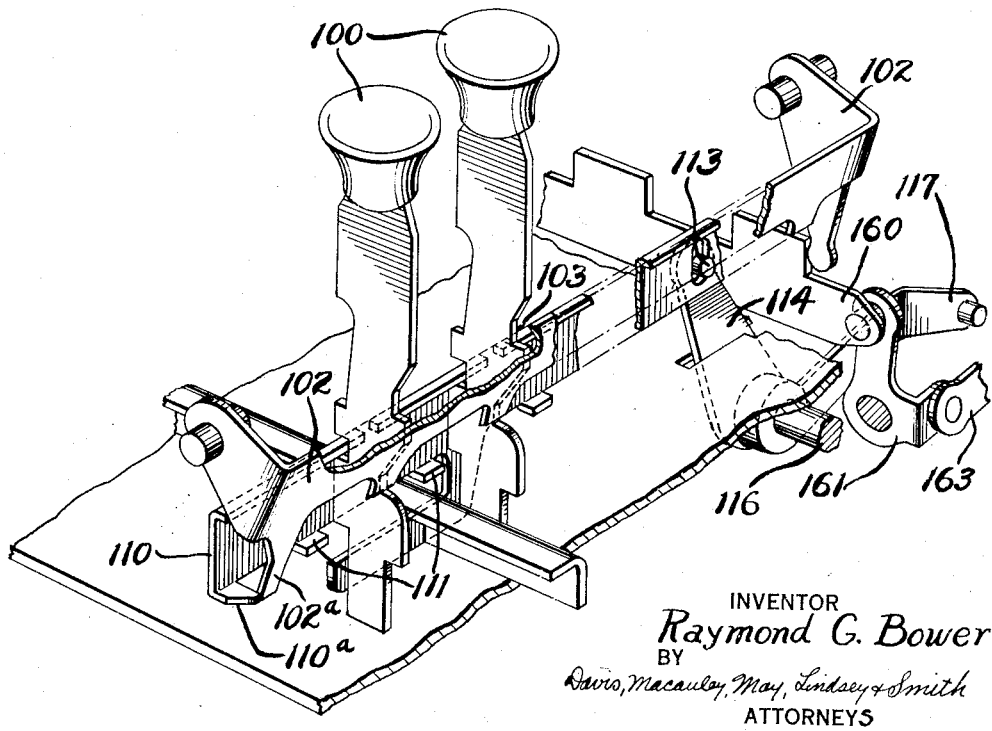

Fig. 11 is a right side elevation similar to Fig. 1 but with a full-keyboard substituted for a "10-key" keyboard;

Fig. 12 is a view similar to Fig. 11 but illustrating the machine advanced in operation with an amount set up in the pin carriage;

Fig. 13 is a partial view of the mechanism shown in Fig. 12 with the machine still further advanced in operation with the pin stops set up by the pin carriage and with the index stops also set up;

Fig. 14 is a fragmentary detail of two keys of the full-keyboard illustrating one key depressed and the other in normal or raised position;

Fig. 15 is a fragmentary perspective of a portion of a full-keyboard; and

Fig. 16 is a partial right side elevation illustrating the release of the index bars upon depression of the motor bar, the parts being in normal position.

General construction

The novel features of this invention are shown as applied to a machine that is well adapted to the average needs and requirements of calculating machines, that is, to a machine that can be used by the average business offices, rather than to a machine particularly adapted to some special use or bookkeeping system. The machine is also illustrated as one that is readily adaptable to be converted from a full-keyboard to a "10-key" keyboard machine although it will be apparent as the description proceeds that several of the features employed are suitable to machines of other characteristics.

The machine structure generally is carried in a frame comprising two side plates 1, one of which is shown in Fig. 1 which are connected together in spaced relation by transverse members, such as shown at A, B and C in Fig. 1, and support between them transverse shafts, rods and other supporting elements such as 10 and 116 (Fig. 1), which are adapted to support a ten-key keyboard, and 98 and 99 (Fig. 11), which are adapted to support a full keyboard. Said frame also supports a cross-tabulating paper carriage C which carriage rotatably supports a platen P. Platen P supports one or more sheets of paper in the usual manner upon which the results of the machine entries or calculations may be printed by type 2 carried by racks or bars 3 and adapted to be driven by hammers 4 in the usual manner.

The machine is also provided with an upper register 6 and a lower register 7 adapted to be moved into and out of engagement with sectors 8 pivoted on a shaft 9 for adding, subtracting and totaling operations. The upper register 6 is merely an adding and totaling register and may be of the type shown in the Pasinski Patent No. 1,778,506, and may be controlled in a similar manner. The lower register 7 is an add-subtract register and may be of the type shown in the Vincent Patent No. 1,027,511 or the Horton Patent No. 1,853,053 or any suitable construction.

The sectors are constantly urged clockwise by springs 11 and are held in a normal or Fig. 1 position by a bail 12 carried by arms 13 journaled on a shaft 9 and integral with a third arm 14 carrying a roller 16 adapted to engage a cam 17 (Fig. 1) mounted on the main control shaft 18. This control shaft contains several cams for controlling the various functions of the machine to be described later and is given a single revolution for each cycle of operation of the machine, the movement being supplied by a motor M (Fig. 6) through a shaft 19 connected by any suitable one revolution clutch 20 to shaft 18 in the usual manner.

The sectors 8 are also each provided with a forwardly extending arm 21 which has a stud and slot connection 22 with type bars 3, the latter being slidably arranged between rollers 23 for substantially vertical linear movement.

Each type bar 3 is provided at its lower end with a magazine 24 containing adjustable differential stops 26 arranged in pairs and connected by U-shaped springs 25 with the exception of one end stop the spring for which is connected to the stop and to the plate 24. There are nine adjustable stops representing digits "0" to 8 in each magazine. There is no adjustable "9" stop but instead each magazine is provided with a permanent limit or stop 26ª. When a stop 26 is depressed or moved rearward as shown in Fig. 1, it remains depressed until restored later in the machine operation, as will hereinafter be described. The depressed stop 26 and/or the permanent stops 26ª abut against the stationary cross-bar 27 fixed to the machine frame and accordingly differentially limit the movement of the type bars in their various printing positions during listing operations of the machine.

A plate 28 (Figs. 3, 11 and 12) is provided at the rear of the stops and mounted for reciprocatory movement toward and from the rear ends of the stops, being normally spring urged away from the stops. At the very initial portion of the cycle of machine operation this plate is moved forward to restore the stops to their original position by means of a cam 29 secured to shaft 18. During a totaling operation, the type bars, of course, are indexed by the register wheels 6 or 7 which are engaged with the sectors 8 for this purpose and are rotated by the sectors until the wheels reach zero, all in the usual manner as disclosed in the aforesaid patent.

The stops 26 are differentially set up by adjustable pins 30 of a sliding and reciprocating pin carriage 31. The pin carriage 31 contains nine rows of pins 30, each row having ten pins representing the digits "0" to "9". The pins are "flexibly" arranged, i. e., each pin is spring urged upward to normal position by a continuous coiled spring 32 (Fig. 5ª) similar to spring 10 (shown in Fig. 11), and is latched when depressed by a pivoted bail 33 for each column. The pins remain latched when depressed until a succeeding key is depressed in the same column in a succeeding machine operation which depresses a pin 30 which in turn rocks the bail to release the previously latched pin and latches the last depressed pin. Accordingly it is only necessary to depress a second pin in any one bank to release a previously depressed pin and no other means is necessary to return the pins 30 to normal position after each machine operation.

For example, assume an amount such as 12345 is set up on the keyboard, the corresponding pins 30 will be set up and the pin carriage will be spaced to the left so that the first five rows of pins will appear directly in line with the first five rows of stops 26. Then, as the machine is given a stroke of operation, the pin carriage will be moved against the stops to set up the amount 12345. Later in the machine operation the pin carriage will be returned to the right where it is in position to receive the next succeeding amount. Assume that the next amount to be entered is 678, which is entered by depressing the keys in the usual manner. Entering 678 steps the pin carriage over three rows and releases the #1, #2 and #3 pins and leaves the #4 and #5 pins of the previous example still set up in the pin section. Because the pin carriage is only moved three spaces to the left for the amount 678, these pins #4 and #5 will not set up stops and will be inactive during the machine operation.

The pin carriage also has a blade 34 (Fig. 5) secured thereto for movement with the carriage. Blade 34 extends to the left of the pin carriage in position over the zero stops in the magazines and will set up all such stops to the left of the amount indexed when the carriage is moved toward the stops.

The pin carriage is slidably mounted on shafts 36 and is constantly urged to the left by a spring 37, the right-hand end of which is secured to the right-hand side member of the pin carriage 31 and the left-hand end of which is secured to the left-hand one of two fixed frame members 49 referred to hereinafter. A tape 38 is attached to the left-hand side member of the pin carriage 31 and extends through the right side plate of the machine where it passes around a pulley after which it is fastened to the lower end of lever 42 (Fig. 6) pivoted at 42$^b$ to the upper end of one arm of a crank 41, the latter being pivoted to the stationary stud 41$^a$. The lever 42 is constantly urged counterclockwise (Fig. 6) by a spring 42$^a$ which is weaker than spring 37. As the keys are depressed, the stronger spring 37 urges the carriage to the left side of the machine and lever 42 is moved clockwise about its pivot against the tension of spring 42$^a$.

After an amount has been set up on the pins 30 and the machine is given a stroke of operation and the pin carriage 31 has been moved as hereinafter described to set up the stops 26, a high portion of cam 39 engages a stud 41$^b$ on crank 41 thereby rocking crank 41 in a clockwise direction and causing the upper end of lever 42 to move rearward until it engages stud 43. Continued clockwise movement of lever 41 causes stud 43 to arrest the upper end of lever 42 whereupon the lower end of lever 42 moves to the rear of the machine thus pulling tape 38 to the rear and causing the pin carriage to restore to the right side of the machine.

During each operation of the machine, the crank 41 is moved in a clockwise direction and if the stud 43 is in the Fig. 6 position the pin carriage will be restored, but, if a repeat key (not shown) is depressed, the stud 43 is raised to clear lever 42 thereby permitting crank 41 to move in a clockwise direction and rock lever 42 without pulling the tape 38 rearward. This allows the pin carriage to remain in indexed position so that the same amount will be entered in the stop section for each successive machine operation or until the repeat key has been released. An escapement rack 44 (Fig. 5) is carried by the pin carriage 31 so as to be movable therewith and is adapted to be engaged by a pair of pawls, to retain the pin carriage against movement to the left. One of these pawls 46 is pivoted at 47 and is normally urged into engagement with the rack 44 by a spring 48. Pawl 46 is adapted to be rocked clockwise to release the rack and carriage for step-by-step movement to the left as will hereinafter be described.

An escapement rack 44 (Fig. 5) is carried by the pin carriage 31 so as to be movable therewith and is adapted to be engaged by a pair of pawls, to retain the pin carriage against movement to the left. One of these pawls 46 is pivoted at 47 and is normally urged into engagement with the rack 44 by a spring 48. Pawl 46 is adapted to be rocked clockwise to release the rack and carriage for step-by-step movement to the left as will hereinafter be described.

In order to cause differential setting of pins 30 in the pin carriage to be transferred to stops 26 and thus limit the type bars in their upward movement, the pin carriage is mounted for movement to and from the stops 26.

As previously stated, the pin carriage is slidably supported on shafts 36. These shafts are supported at their outer ends by frames 49 provided with rearwardly extending arms pivotally connected by studs 51 projecting from frames 49 to levers 52 extending downward to and journalled on a stationary shaft 53. Each frame 49 also carries a stud 54 (Fig. 6) engaged in a slot 55 in the stationary frame of the machine. Stud 51 extending from the right frame 49 is also connected to a link 56 which has a hook connection with a stud 57 carried by crank 58 pivoted at 59 to the stationary frame of the machine. Crank 58 contains two rollers 61 and 62, which engage detachable cam plates, later to be described, secured to a cam 63 rigidly secured to the main driving shaft 18 for reciprocating the pin carriage. The heretofore mentioned cam plates are detachable to facilitate conversion of the machine from a "10-key" to a full-keyboard machine. The pin carriage, therefore, is permitted to move from right to left on its sliding shafts 36 and is also caused to be moved forward and backward relatively to the stop magazines on the type bars. This latter movement enables the index pins 30 set up in the pin carriage to set up corresponding stops in the stop magazine carried by the type bars and may be varied in timing by varying the detachable cam plates as will be described.

"10-key" keyboard construction—listing operation

Figs. 1 to 8 illustrate the machine construction as it is adapted to a "10-key" keyboard which is detachably supported on the machine frame on the members 10 and 11. The arrangement of the keys is shown more particularly in Fig. 1$^a$. In this construction the amount determining devices comprise ten keys and associated elements. Each of the ten keys 64 is pivoted to a cross pin 65 and is urged in a clockwise direction by spring 66. Each key is also provided with a downwardly extending arm 67 having a lug 68, the lugs of the several keys being positioned in their proper orders and representing the digits from "0" to "9". The lugs 68 of the keys 64 are positioned directly over and in alignment with the pins 30 of the pin carriage 31, as shown more clearly in Figs. 1 and 2. Therefore when a key is depressed, its lower lug 68 depresses the corresponding pin 30 in the first row at the left side of the pin carriage 31.

Depression and release of any of the keys also causes the pin carriage to escape one step to the left under urge of the spring 37 whereupon the succeeding row of pins 30 to the right is positioned under the lugs 68 and in front of stops 26.

For releasing the escapement mechanism each of the keys 64 (Fig. 1) is provided with a downwardly extending lug 69 adapted to engage a bail 70 pivoted at 71 to the keyboard frame. The bail is connected to the upper end of a link 72. (Figs. 1, 2 and 5) the lower end of which is connected to one arm of a crank 73 (Fig. 5) pivoted at 74 to pawl 46. The other arm of crank 73 terminates in a pawl 75 which is the second pawl adapted to engage rack 44.

Pawl 75 serves as an intermediate escapement pawl; that is, each time a key is depressed link 72 (Fig. 5) is moved upward to rock pawl 75 counterclockwise to engage the top of the teeth of rack 44. Continued counterclockwise movement of pawl 75 and crank 73 after the former engages the rack teeth moves pawl 46 clockwise about its pivot 47 until pawl 46 moves out of engagement with rack 44 because crank 73 is connected to pawl 46 by pin 74. Thereupon pin carriage 31 is moved to the left by spring 37 until pawl 75 drops in front of the next rack tooth, in which position the pin carriage is momentarily held until the key is released. Upon release of the key link 72 is released to move downward and to disengage pawl 75 from rack 44. Lowering of crank 73 permits pawl 46 to reengage rack 44 and allows the pin carriage to move to the left the remaining half step necessary in the escapement movement. The row of pins 30 in which a pin was set by the depression of the key just released is then directly over the first right row of stops 26. Of course, if more than one key is depressed, the pin carriage is moved successively the necessary number of spaces to the left until the necessary number of pins 30 corresponding to the amount entered are positioned directly over the corresponding stops 26.

After an amount has been set up on the keyboard, the machine is ready for operation. Machine operation is initiated by depression of the motor bar 76 (Fig. 6); which engages a stud 77 and through arms 78 and 79 on shaft 80, arm 81, and suitable connections, not shown, but which may be similar to those shown in the Horton Patents No. 1,781,689 and No. 2,004,282 and the Muller Patent No. 1,757,134; closes the normally open motor switch to start the motor M. Motor M through shaft 19 and clutch (not shown) rotates the main control shaft 18 in a clockwise direction, one revolution for each machine operation.

Figures 2, 3:
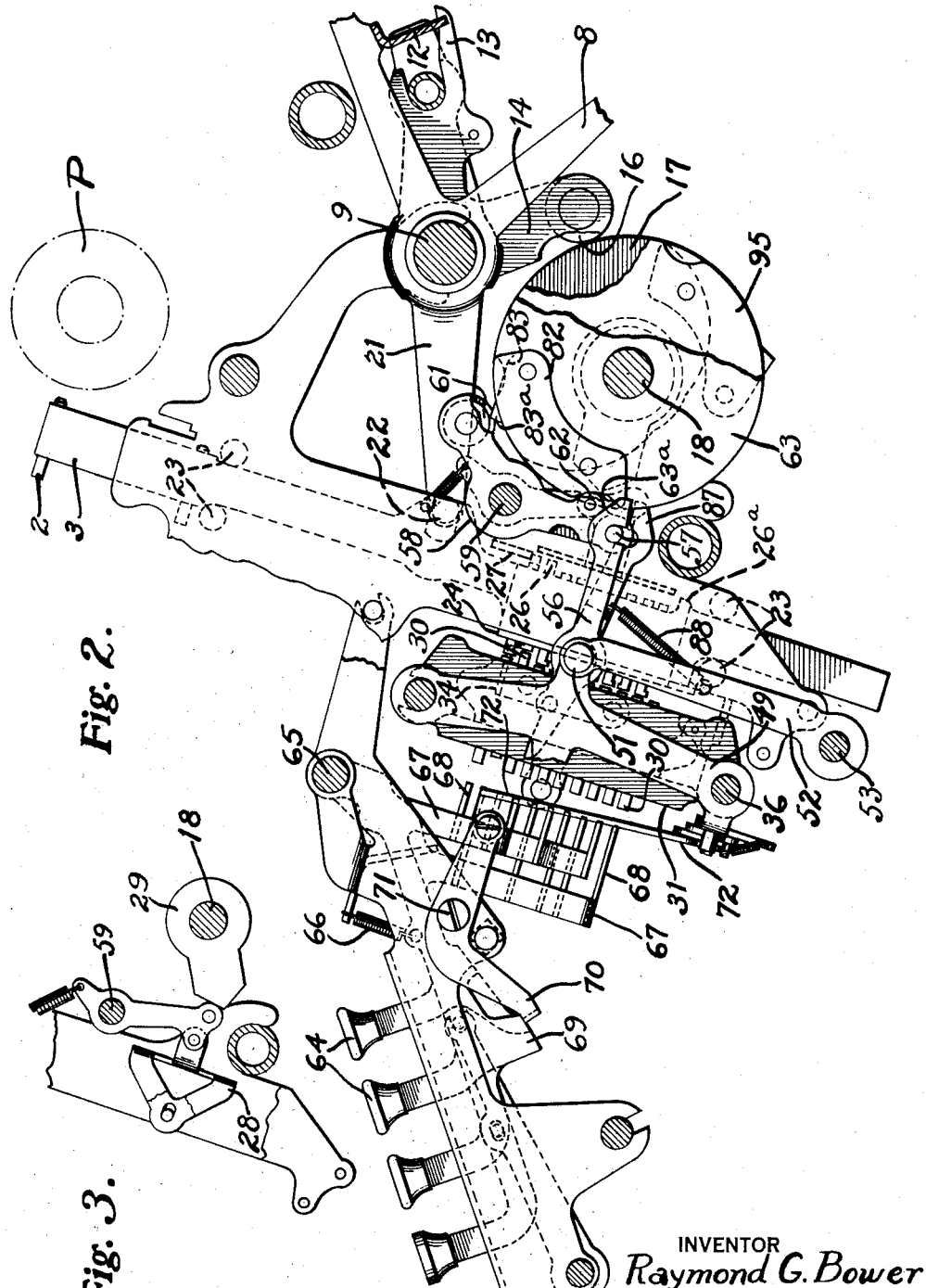
Fig. 2 is a view similar to Fig. 1 but after a pin in the pin carriage has been set by depression of a key and the machine has been partially operated and the said pin has set the stop.
Fig. 3 is a partial side elevation illustrating the stop restoring mechanism.

For listing operations when a "10-key" keyboard is used plates 82 and 83 are secured to opposite sides of cam 63 in position to be engaged by rollers 62 and 61 respectively (Figs. 1, 2 and 7) which extend different distances from crank 58. Plate 82 is attached to the outside surface of cam 63, and plate 83 is attached to the inside surface thereof both at approximately the same peripheral positions whereby roller 61 will engage cam 63 and plate 83, and roller 62 will engage cam 63 and plate 82. The position of plates 82 and 83 is such that as cam 63 starts to rotate, i. e. at the initial part of the cycle of machine operation and immediately after pins 26 have been restored by cam 29 and plate 28 from their previous setting, the pointed extension 83ᵃ of plate 83 engages roller 61 and moves crank 58 counterclockwise as shown in Fig. 2 until roller 62 engages the pocket 63ᵃ of cam 63, and a corresponding cut away portion 82ᵃ of plate 82. As cam 63 continues its rotation, roller 62 rides up the cam to restore crank 58 to its normal position where the rollers 61 and 62 both engage the periphery of cam 63. This rocking motion of crank 58 caused by rotation of cam 63 moves the pin carriage 31 rearwardly causing its pins to engage stops 26 to set up corresponding stops in magazines and thereafter moves the pin carriage forwardly to normal position where it is retained during the remaining portion of the machine cycle.

The purpose of plate 82 is to close the cut out or low point 63ᵇ (Fig. 7) of cam 63 so that the small roller 62 will not drop into the opening as the cam is rotated and thus move the pin carriage rearwardly at the wrong point in the machine operation. The depression 63ᵇ is used in the full keyboard construction as will later be explained.

Following rearward and return forward movement of the pin carriage continued rotation of shaft 18 occurs and the sectors 8 are allowed to descend to their respective positions as determined by the stops 26 limiting against the stationary plate 27 thus positioning type 2 in printing relation to platen.

After the pins in the pin carriage have been set up and the pin carriage moved rearward during the early part of the machine operation by cam 63 and crank 58 to set up corresponding stops in the stop magazines and has been returned to normal position by the same cam and crank, the pin carriage is returned to the right by means of tape 38 controlled by cam 39 on shaft 18. The pin carriage is restored to its normal position by the time the machine has completed about one-half of the cycle so that the pin carriage is ready to receive its second amount while the machine is completing the last half of the first operation or cycle.

Ten key keyboard construction—Totaling operation

Totaling of the registers of the present machine is accomplished by depression of a total key 84, Fig. 6, there being a total key for each individual register 6 and 7, Fig. 1. Depression of the total key causes its associated register to engage the sectors during the forward machine stroke and permits the type bars to be indexed to corresponding amounts as determined by the permissible rotation of the register wheels when rotated to their zero positions. The connections for causing the aforesaid engagement of the registers and sectors for total-taking operations are not shown in detail as they are well known and common in calculating machines. Depression of any total key also starts the driving motor which in turn drives control shaft 18 a single revolution in clockwise direction.

During listing operations cam 63 controls movement of the pin carriage but it is obvious that the pin carriage should not be actuated during the first part of the cycle of machine operation in totaling operations because the type bars should then be under the control of the registers rather than by the stops carried by the type bars. However, after the registers have been rotated to their zero position and the printing of the total has been accomplished, during the forward stroke of the machine at the initial half revolution of shaft 18, the registers should be and are disengaged from the sectors in the usual manner by mechanisms not shown but well understood in the art. The type bars as well as the sectors are then immediately released and would move to their No. 9 position, due to the action of springs 11, if some means were not provided to prevent this movement. Such movement is undesirable at this time because it is frequently desirable to condition one or more of the registers for add or subtract operations while the other register is being totalized. If the sectors were released after one of the registers had been cleared this unnecessary movement of the sectors would affect the amounts entered in the second register. For this reason the pin carriage is utilized to prevent release of the type bars after one of the registers has been cleared.

In order to prevent blade 34, Fig. 5, from setting up all cipher stops at the beginning of a totaling machine operation the connection between the pin carriage and the listing cam 63 is disengaged during totaling operations. For this purpose a lever 85, Fig. 6 is provided and is positioned to be engaged by the lower ends of the total keys 84. The lever 85 is pivoted at 86 and contains a downwardly extending arm carrying a stud 93 which engages the forwardly extending arm of link 56 connecting the pin carriage to the crank 58. Therefore, depression of the total key rocks link 56 counterclockwise, raising the hooked end to disengage it from stud 57, Figs. 1 and 2. Therefore, as the listing cam 63 is rotated, plate 83 will rock crank 58 in the usual manner but link 56 and pin carriage 31 will not be moved.

After the registers have been zeroized and the total amount printed from the type bars and before the registers are disengaged from the sectors, that is, at the beginning of the return stroke the pin carriage is automatically moved toward the index stops. But because the pin carriage is now in its extreme right position during total-taking operations as shown in Fig. 5, only the stops in line at zero position directly under blade 34 are set up.

These stops that are under blade 34 are the ones directly below the stationary plate 27 and, therefore, these stops which are depressed by the blade serve to prevent further upward movement of the type bars and of the sectors after the register wheels have been zeroized during a totaling operation and are disengaged from the sectors. This blocking of the sectors prevents unnecessary banging of the sectors against their limit stops during total-taking operations.

Of course, at this time, some of the type bars are in their raised positions because of the rotation of the register wheels having moved to their zero positions in total printing but further movement will be prevented by stops 26.

During the latter half of the totaling operation bail 12, Fig. 1, will be returned counterclockwise and will engage each of the sectors to restore them to their normal position, which in turn will lower each of the type bars to their normal positions.

Movement of pin carriage 31 in order to set up stops 26 to prevent unnecessary movement of the type bars during the totaling operation is accomplished as follows:

As has been previously explained depression of the total key disengages link 56 from stud 57 so that the plate 83 on the listing cam will not affect the pin carriage. Link 56, however, has an arm 87, Figs. 2 and 6, rigidly secured thereto. A spring 88 urges both link 56 and arm 87 in a clockwise direction during listing operations but when the total key is depressed and link 56 is moved counterclockwise, arm 87 is likewise moved, which causes its hooked end to engage a stud 89, Fig. 6, carried by a crank 90 pivoted at 59 and similar to crank 58 for controlling the listing function of the pin carriage. The second crank 90 is located just to the left of crank 58 and carries two studs 91 and 92 engageable with a total cam 95 carried by the main drive shaft 18 and positioned to the left of listing cam 63, controlling crank 90 in a manner similar to the listing crank 58 but during a different portion of the machine operation.

As shown in Fig. 8, the totaling cam 95 is provided with two cutouts 95ª and 95ᵇ, but when used with the "10-key" keyboard construction is provided with two plates 96 and 97 attached at approximately diametrically opposite sides of the cam. Plate 96 is attached to the outside surfaces of cam 95, where it will be engaged by stud 92, whereas plate 97 is attached to the inside surface, where it will be engaged by stud 91.

When the total key is depressed and the machine is given a stroke of operation causing clockwise rotation of shaft 18, lever 90 being connected by lever 87 to the pin carriage, is not moved for the first half of the revolution of cam 95, during which time the registers are cleared. But immediately thereafter a high point 97ª of plate 97, Figs. 6 and 8, engages roller 91 and rocks crank 90 counterclockwise until its lower roller 92 drops into the pocket 95ᵇ and moves the pin carriage against the stop 26 of magazine 24, causing depression of each of the stops under blade 34 to prevent unnecessary movement of the type bars during total-taking operations. After these stops have been set up, continued rotation of cam 95 moves crank 90 and restores the pin carriage to normal position during the remaining portion of the totaling cycle. During this period studs 91 and 92 engage the periphery of the totaling cam 95.

Plate 96 is used on the totaling cam 95 to prevent roller 92 from dropping into the opening 95ª which latter opening is needed for the full-key keyboard construction. The plate 97 used in connection with the totaling cam 95 performs the same function with respect to the pin carriage as does plate 83 in listing operations. The plate 83, however, merely changes the time at which the pin carriage is moved into engagement with the stops 26.

When the totaling operation is completed and the total key is restored to normal position, the hooked links 56 and 87 are restored in clockwise direction by spring 88 so that lever 56 is again engaged with stud 57 of crank 58 for the succeeding listing operations. In other words, the machine is normally conditioned for listing operations but upon depression of either total key 84 the operation of the pin carriage is varied to conform with the requirements of a totaling operation.

*Full-key keyboard construction—Listing operation*

The present machine is readily adaptable and connectible to either a "10-key" keyboard construction or a full keyboard construction. A full keyboard construction is shown more particularly in Figs. 9 to 16. The full keyboard is detachably supported on the machine frame on the members 98 and 99 as shown in Fig. 11. In this construction the amount determining devices comprise a full keyboard and associated elements having a plurality of rows of keys 100, each row containing keys numbered from 1 to 9, inclusive. The keys of each bank are urged upwardly to their normal positions by a continuous coil spring 101 and when depressed are latched in depressed position by a pivoted bail 102 extending the full length of each row or bank of keys. The bail is spring urged into engagement with the key stems which are notched as at 103 to permit the bail to engage therein and retain the key in depressed position. An index slide 110 for each bank extends the full length of each row of keys and is constantly urged rearwardly or to the right as viewed in Fig. 11 by a spring 112 but is held in normal or forward position thereagainst by means later described. Each of the index slides 110 is connected by a stud and slot connection 113 to an arm 114, Fig. 15, of a bell crank which extends through the lower keyboard plate and is freely pivoted on shaft 116. The other arm 117 extends rearward and is connected by a slot and stud connection 118 to an index bar 119 supported by shafts 121, 122, 123 for substantially vertical linear movement. Each index bar 119 has a rearwardly extending pin-like projection 120 adapted to engage the pins 30, as will later be explained. The bars and projections being connected to the slides 110 are set in accordance with the keys depressed.

A bail 125, Fig. 16, extends under each of the arms 117 and in normal position retains the arms 117 in extreme counterclockwise position and accordingly holds the index slides 110 to the left or normal forward position as viewed in Fig. 11. Bail 125, Fig. 16, is supported by arms 126 fixed to shaft 116 to which is also fixed a crank 127. Crank 127 is connected by a link 128 to another crank 129 carrying a roller 130 engageable with a cam 131 carried by the main shaft 18. The main shaft 18, therefore, causes the bail 125 to move first in a clockwise direction and then counterclockwise to normal position during which movement arms 117, slides 110 and index bars 119 are allowed to move to their indexed positions that is until lugs 111 of the slides engage the depressed key stems. A lug 110ᵃ is formed upon the forward end of each slide 110 in position to engage a finger 102ᵃ depending from the associated bail 102. These lugs restrict movement of those slides in banks where no key is depressed upon a machine operation in which bail 125 is moved to release the slides.

Although, as previously stated, the machine is adaptable to hand or power operation, the full-key keyboard construction is illustrated as adapted for power operation. Accordingly a motor bar 133 (Fig. 12), which starts the driving motor through connections not shown but which may be like those shown in the Horton Patents No. 1,781,689 and No. 2,004,282 and Muller Patent No. 1,757,134, is provided with a shank 135 carrying a stud 136 which engages and rocks crank 137 clockwise, which in turn through a stud and slot connection 138 moves link 139 forward or to the left. Link 139 acting through arm 141 rocks shaft 142 clockwise. Attached to shaft 142 is a hook 143 engageable with a lug 144 carried by an arm 146 fixed to shaft 116 which shaft carries the two arms 126 that support the bail 125. Cam 131 is so timed that during each operation after the indexing has occurred, crank 129 is rocked counterclockwise and permits the hook 143 to engage lug 144 as shown in Fig. 16. As the machine reaches its normal position at the close of the cycle, cam 131 moves slightly beyond its contact of roller 130 and leaves the hook 143 the sole means of retaining the bail 125 and the arms 117 in their normal position.

Depression of the motor bar for the next machine operation rocks hook 143 clockwise out of engagement with lug 144 to release the bail 125 immediately and before the machine and the main shaft 18 has started to rotate. In other words, depression of the motor bar allow stud 130 of crank 129 to drop and dash position, Fig. 16, until the stud 130 engages the inclined surface 131ᵃ of cam 131 in which position the bail 125 is momentarily held. As soon as the cam 131 starts to rotate crank 129 will move the remaining distance to permit the indexing mechanism to move to the No. 9 position if necessary. The cam surface 131ᵃ is used to temporarily hold or delay the movement of bail 125 to prevent a rebound from a too rapid descent of bail 125 and the index bars 119.

It is necessary, of course, to drop the index bars at the initial portion of the machine cycle in order that the index bars 119 will be in position to set up pins 30 in accordance with the amount set up on the keys.

Upon depression of the motor bar, arms 117 and bars 119 in those columns where no keys have been depressed are allowed to drop until the projections 120 are moved from their normal position, Fig. 11, to a position directly over the zero pins 30 of the pin carriage 31, the movement being permitted by a slight clearance between downwardly extending lug 102ᵃ of bail 102 and lug 110ᵃ of slide 110.

A slight change in the pin carriage position is required when the full-key keyboard is used, that is, the pin carriage 31, instead of being positioned to the right of the stop magazines or differential mechanism as is shown in Fig. 5 is moved to the left directly over all of the stops 26 and it is rigidly secured in this position by collars fastened to shafts 36. In other words, the pin carriage is positioned so that the first left row of pins 30 is directly over the first left row of stops 26.

In the full-key keyboard construction the pin carriage is moved against the index bars instead of the key lugs being moved against the pins of the pin carriage as in the case of the "10-key" keyboard construction. For this purpose the same mechanism is utilized for moving the pin carriage as is used in the "10-key" keyboard construction. The cam 83 used for listing in the "10-key" construction is utilized in the full keyboard construction and is provided with a cam plate 150 which replaces plate 82 used in the "10-key" keyboard construction being applied to the outside surface of cam 83 to cover the cutout 83ᵇ. The timing is such that as the machine is operated stud 130, Fig. 16, engages the bottom of cam 131 just before lug 150ᵃ of plate 150 engages the small stud 62 of crank 58, thereby rocking the latter in a clockwise direction and moves the large stud 61 into the recess 83ᵇ of cam 83. The clockwise movement of crank 58, through link 56, moves the pin carriage to the position of Fig. 12, causing the projections 120 of index bars 119 to set up the necessary pins 30 in the pin carriage 31. Following this as the projection 150ᵃ of the plate 150 passes beyond the stud 62, the opening 83ᵇ of cam 83 again rocks crank 58 counterclockwise to return the pin carriage to normal or central position.

The timing is such that plate 150 moves the pin carriage into engagement with the index bars before plate 83 comes into operation with the result that after the pin carriage has been moved into engagement with index projections 120 and is returned, plate 83 becomes active as shown in Fig. 13 and rocks crank 58 counterclockwise the same as in the "10-key" keyboard operation which causes pins 30 of the pin carriage to set up the corresponding stops 26 in each of the type bar magazines.

In other words, the full-key keyboard construction uses the same cam plate 83 for moving the pin carriage into engagement with the stops on the type bars as in the "10-key" construction which movement takes place at exactly the same time regardless of which keyboard is used, however, in the full-key keyboard construction the pin carriage must first be moved into contact with the index bars. Because of the small amount of time existing between the start of the machine and the action of plate 150, it is necessary to allow the index bars 119 to commence their movements immediately upon depression of the motor bar and before the machine operation has actually started.

*Full keyboard construction—Early release of keys*

The shape and timing of cam 131 (Fig. 16) is particularly beneficial in giving an early release of the keys. It will be noted that upon depression of the motor bar crank, 129 is permitted a partial movement after which a slight movement of cam 131 permits full and rapid movement of crank 129 to release all the indexed bars. When stud 130 is at the bottom of cam 131, the full action of the indexing means has been completed, that is, the pins 30 have received the amount set up on the keys. The cam 131 thereafter acts to restore crank 129 together with the bail 125 and the associated indexing mechanism during the early part of the machine operation, with the result that when cam 131 has completed about one-quarter of its revolution, all the indexing mechanism has been restored to normal position, after which the rest of the machine operation continues. Immediately after this one-quarter revolution, bails 102 are rocked to release all depressed keys. This is accomplished by means of a blade 160 (Figs. 15 and 16) engageable with each of the bails 102 and connected at one end to one arm of a bell crank 161. The other arm of the bell crank is connected to one end of a pivoted lever 163 which carries a roller engageable with a cam 164 on shaft 18. Accordingly, an operator can set up a second amount in the keys while the machine is going through the major portion of the cycle of operation for registering and printing previous amounts set up.

*Full keyboard construction—Totaling operation*

The same lever 85 rocked by the total key 84 is utilized to disable the action of the listing link 56 and enable the totaling link 87 and the totaling cam 95 to function in exactly the same manner in both the "10-key" and the full keyboard construction.

In the full keyboard construction, depression of the total key 84 (Fig. 16) which rocks lever 85 also rocks shaft 142 (Fig. 12) in a clockwise direction in order to start the motor and to release lug 144. This is accomplished through a link 170 (Fig. 16) connected at one end to lever 85 and at its other end by a stud slot connection to an arm 171 of crank 137 which latter crank rocks shaft 142 through link 139 and arm 141. Release of lug 144 during a total operation permits downward movement of bail 125 exactly the same as during a listing operation.

No keys have been depressed during a totaling operation but, upon depression of a total key, the index bars 119 are immediately released to move to their zero positions at the same time the motor is started to rotate shaft 18 and, therefore, all index bars 119 will be stopped in their zero positions by the lugs 110ª and 102ª setting the index slides 110 in their zero positions.

Referring to Figs. 10 and 10ª, it will be seen that the same control cam 95 is also used for the "10-key" keyboard construction and the full keyboard construction in total taking. The same plate 97 is used in connection with cam 95 and it is attached to the inside of cam 95 for the purpose of moving the pin carriage into engagement with the stops 26 after the registers have been zeroized and in order to prevent unnecessary upward movement of the type bars 24 after the register has been disengaged from the sectors. In the "10-key" keyboard construction, the pin carriage (Fig. 5) is in its right position where the blade 34 is positioned directly over the zero pins 30 and during a totaling operation when the type bars have been indexed by the zeroizing of the registers the pin carriage is moved toward the stops 26 resulting in setting up a zero stop in each column immediately below the plate 27 (Fig. 1).

In the full keyboard construction, the pin carriage is normally in the left position; therefore each of the pins 30 are directly over the corresponding stops 26 and therefore the blade 34 cannot be used. For this reason, the index bars 119 (Fig. 12) are used to set up the zero pins in the pin carriage so that after the pin carriage is moved against the stops 26, the type bars will be prevented from moving upward when the register is disengaged from the sectors.

The totaling cam 95 (Fig. 10) is provided with a cam plate 155 having a high point 155ª which takes the place of plate 96 and like plate 96 is attached to the outside surface of the cam 95 in position to move the pin carriage into engagement with the index bars at the very early part of the machine operation or cycle by engagement with stud 92. The pin carriage, however, cannot be moved immediately into engagement with the stops 26 at this part of the machine operation because the type bars and sectors have not yet been indexed by the zeroizing of the registers. Therefore, after the zero pins of the pin carriage have been set up by the index bars 120, the pin carriage is returned to its central or normal position and remains inactive until the register has been zeroized. At this time, plate 97 (Figs. 8 and 10) which is attached to the inside surface of cam 95 being the same plate used with the "10-key" construction as shown in Fig. 8 causes the pin carriage to move into engagement with the stops 26 and set up all stops which are directly below the stationary plate 27. This prevents upward movement of the type bars after the register has been withdrawn from the sectors.

From the foregoing description, it will be seen that when a "10-key" keyboard construction is used as shown in Figs. 1 to 8 the pin carriage 31 is allowed to slide from side to side on the shafts 36 under the urge of the spring 37 and under the control of escapement rack 44. The pins in the pin carriage are differentially set by movement of the keys and the key lugs toward the pin carriage. The pin carriage is also mounted for movement relatively to the differential mechanism whereby the differentially set pins of the pin carriage cause the stops in the type bar magazines to receive a similar differential setting.

When the machine is converted from a "10-key" keyboard to a full keyboard construction shown in Figs. 9–16, the "10-key" keyboard is, of course, removed and the full keyboard is substituted therefor. A cam 131, bell crank 129, cam 164 and lever 163 must be added unless the machine was provided with these parts when originally assembled, and the link 128 must be connected between the bell crank 129 and the arm 127. The pin carriage 31 is rigidly fastened in a position directly over the corresponding stops of the type bar magazine. The escapement mechanism for this construction is, of course, no longer necessary and may be omitted, and the pin carriage is moved toward the index bars instead of the indexing fingers being moved toward the carriage pins.

The same cams 63 and 95 are used but their effects are modified by merely changing some of the cam plates thereon to conform as previously discussed. Certain main essentials of the machine such as the frame, actuators, type bars, pin carriages, and general assembly require no change whatever with the exception of the keyboards.

The full keyboard construction shown in Figs. 9–16 is so constructed and arranged that all the associated parts such as the arms 117, the index bars 119, the bail 125 and the motor bar connections all disassemble as a complete unit and are easily installed on the side plates of the machine. The same is true of the ten keyboard construction. In other words, there are no major constructional changes necessary other than the changing of the keyboard and some minor changes such as changes of cam plates.

It will be apparent to those skilled in the art that minor changes may be made in the details of construction without departing from the spirit and scope of this invention as defined in the claims.

I claim:

1. In a calculating machine of the class described having means for giving it cycles of operation; selectively depressible amount keys, means for latching depressed keys in depressed position, setting means controlled by said keys, a movable support, a plurality of groups of settable members in said movable support, a plurality of movable differential members, means on said differential members cooperable with said settable members for determining the movement of said differential members during a machine cycle, means operable at the beginning of a machine cycle to move said movable support so as to cause settable members therein momentarily to engage with and be set by said setting means in accordance with the keys depressed and to thereafter retract said movable support, and means controlled by said cycling means to operate said key-latching means to release the depressed keys after said movable support has been retracted, whereby the amount keys are free for depression while the differential members are being moved during the machine cycle.

2. In a calculating machine of the class described having means for giving it cycles of operation; selectively depressible amount keys, means for latching depressed keys in depressed position, setting means controlled by said keys, a plurality of movable differential members carrying settable pins for controlling the movement of said members, a pin carriage having a plurality of rows of settable pins, moving means operable at the beginning of a machine cycle to move said pin carriage bodily to cause pins therein to be engaged momentarily with said setting means to thereby set said carriage pins in accordance with the keys depressed and to thereafter retract said carriage and move it to cause its set pins to set pins on said differential members, and means controlled by said cycling means to operate said key-latching means to release the depressed keys after said pin carriage has been retracted, whereby the amount keys are free for depression while the differential members are being moved during a machine cycle.

3. In a calculating machine adapted for use interchangeably with a ten-key keyboard having a single set of digital amount determining devices or with a full keyboard having digital amount determining devices for each of a plurality of numeral orders, the combination of means for detachably supporting either of said keyboards on the machine, movable differential members for each of said numeral orders, a movable support, settable members for each of said numeral orders on said movable support, means on said differential members cooperable with said settable members for determining the movements of said differential members during a machine cycle, means for moving said movable support, means controllable by the amount determining devices of the ten-key keyboard to control said movable support in its movement to place the settable members of successive orders successively in position to be set by the amount determining devices of the ten-key keyboard when said keyboard is attached to said supporting means, and means for moving said movable support so as to cause said settable members of the several numeral orders to be engaged simultaneously with the amount determining devices of corresponding numeral orders of the full keyboard when the latter keyboard is attached to said supporting means.

4. In a calculating machine adapted for use interchangeably with a ten-key keyboard having a single set of digital amount determining devices or with a full keyboard having digital amount determining devices for each of a plurality of numeral orders, the combination of means for detachably supporting either of said keyboards on the machine, movable differential members for each of said numeral orders, a movable carriage, a plurality of groups of settable elements in said carriage, means for moving said carriage, escapement means operable by the amount determining devices of the ten-key keyboard to control said carriage in its movement to place said settable members of successive groups successively in position to be set by the amount determining devices of the ten-key keyboard when said keyboard is attached to said supporting means, means on said differential members cooperable with said settable elements, means for moving said carriage so as to cause set settable elements therein to cooperate with said means on said differential members to determine movements of said differential members during a machine cycle, and removable means for moving said carriage to engage said settable members of said plurality of groups simultaneously with the amount determining devices for said plurality of orders of the full keyboard when the latter keyboard is attached to said supporting means.

5. In a calculating machine adapted for use interchangeably with a ten-key keyboard having a single set of digital amount determining devices or with a full keyboard having digital amount determining devices for each of a plurality of numeral orders, the combination of means for detachably supporting either of said keyboards on the machine, movable differential members for each of said numeral orders, settable elements on each of said differential members for controlling movements of the latter, a movable support, settable members on said movable support for each of said numeral orders, means for moving said movable support, means controllable by the amount determining devices of the ten-key keyboard when the latter is attached to said supporting means for controlling said movable support in its movement to place said settable members for successive orders successively in position to be set by the amount determining devices of said ten-key keyboard, and means for moving said movable support so as to cause said settable members for said plurality of numeral orders to be engaged simultaneously with the amount determining devices of corresponding numeral orders of the full keyboard when the latter is attached to said supporting means.

6. In a calculating machine adapted for use interchangeably with a ten-key keyboard having a single set of digital amount determining devices or with a full keyboard having digital amount determining devices for each of a plurality of numeral orders, the combination of means for detachably supporting either of said keyboards on the machine, movable differential members for each of said numeral orders, settable elements on each of said differential members for controlling movements of the latter, a movable carriage, a plurality of groups of settable members in said carriage cooperable with said settable elements on said differential members, means for moving said carriage, escapement means operable by the amount determining devices of the ten-key keyboard to control said carriage in its movements to place said settable members of successive groups successively in position to be set by the amount determining devices of the ten-key keyboard when the latter is attached to said supporting means, means for moving said carriage so as to cause set settable members of the several groups in said carriage to engage and thereby set settable elements on said differential members of corresponding numeral orders, and removable means to move said carriage so as to cause said settable members of said plurality of groups therein to be engaged simultaneously with the amount determining devices for said plurality of orders of the full keyboard when the latter keyboard is attached to said supporting means.

RAYMOND G. BOWER.